United States Patent [19]

Crouch

[11] 3,996,088
[45] Dec. 7, 1976

[54] METHOD OF ASSEMBLING AND EMBOSSING MULTIPLE LAYER WORKPIECES

[75] Inventor: Ivan P. Crouch, Leicester, England

[73] Assignee: USM Corporation, Boston, Mass.

[22] Filed: Aug. 28, 1972

[21] Appl. No.: 284,040

[30] Foreign Application Priority Data

Aug. 28, 1971 United Kingdom ............ 40454/71

[52] U.S. Cl. .............................. 156/211; 156/220; 156/222; 156/251; 156/267; 156/273; 156/306

[51] Int. Cl.² .................. B32B 31/18; B32B 31/20; B32B 31/22

[58] Field of Search .......... 156/196, 211, 219, 220, 156/251, 252, 253, 267, 273, 306; 161/40, 119

[56] References Cited

UNITED STATES PATENTS

| | | | |
|---|---|---|---|
| 2,726,941 | 12/1955 | Markus et al. | 161/119 |
| 2,729,009 | 1/1956 | Markus et al. | 156/219 |
| 2,729,010 | 1/1956 | Markus et al. | 156/219 |
| 3,053,960 | 9/1962 | Spieles | 156/251 |
| 3,200,025 | 8/1965 | Edmondson | 156/220 |
| 3,244,571 | 4/1966 | Weisman | 156/196 |
| 3,301,728 | 1/1967 | Swartz | 156/220 |
| 3,535,182 | 10/1970 | Meier-Maletz | 156/253 |
| 3,537,874 | 11/1970 | Ramey | 156/219 |
| 3,547,724 | 12/1970 | Zagusta | 156/253 |
| 3,616,026 | 10/1971 | Larsen | 156/234 |
| 3,629,035 | 12/1971 | Kuroda | 156/219 |
| 3,701,707 | 10/1972 | Scholl et al. | 156/219 |
| 3,705,071 | 12/1972 | Gras | 156/220 |
| 3,711,362 | 1/1973 | Ballard | 156/251 |

*Primary Examiner*—William A. Powell
*Assistant Examiner*—Basil J. Lewis
*Attorney, Agent, or Firm*—Aubrey C. Brine; Richard B. Megley; Vincent A. White

[57] ABSTRACT

A method of assembling and embossing a multiple layer workpiece has, in a most complete conception, a first die having die surfaces for defining periphery of an area portion to be embossed on the workpiece which engages a blank to mark the blank with the die surfaces. Means are then located on the blank relative to the mark for operating on the blank to make a model of the desired workpiece from the blank. A second die is made conformably with the model. Workpiece layers are then assembled in overlapping relation and welded together by the first die along the periphery of the area porton defined by the die surfaces. Portions of one layer outside the welded periphery are then removed to leave the area portion covered by the one layer and secured to the other about the periphery of the area portion. The second die is then registered with the workpiece, the workpiece embossed into conformity with the second die and the one layer welded to the other layer over the entire area portion to form an embossed multiple layer workpiece.

2 Claims, 4 Drawing Figures

METHOD OF ASSEMBLING AND EMBOSSING MULTIPLE LAYER WORKPIECES

BACKGROUND OF THE INVENTION

In recent years rising labor and material costs have prompted industrial investigation of materials which may be suitably substituted for those traditionally employed. Such investigations have suggested the substitution of thermoplastic materials for uses formerly employing leather and cloth because these materials are often less expensive and easier to form into a desired article than leather or cloth. As a result, the shoe and other industries using large amounts of leather and/or cloth have increasingly attempted to substitute thermoplastic materials for their traditional counterparts.

Commercial acceptance of thermoplastic materials as substitutes for traditional materials has at times required that the thermoplastic materials be processed to resemble the displaced traditional materials. In the shoe industry, for example, heat softening thermoplastic materials to weldingly combine the materials with seams is substantially functionally equivalent to a stitched seam but is not generally commercially acceptable because of appearance. However, welded seams are usually easier to form than stitched seams. Thus, cost reductions and commercial acceptance could be achieved if welded seams were made to resemble stitched seams. Embossing thermoplastics with a die having desired features and heat and pressure can provide this resemblance. Similarly, other surface patterns and characteristics could be embossed on thermoplastic material to cause the thermoplastic materials to resemble traditional materials, thereby achieving still further cost reductions and improved commercial acceptance of the thermoplastic materials.

When traditional articles are comprised of leather or cloth, the thread of stitches or decorative bits of leather or cloth employed is frequently of a different color from adjacent portions of the material of the article. Embossing thermoplastic materials has not hitherto satisfactorily provided a two-color appearance to the material and in this respect failed to duplicate the appearance of traditionally made articles.

Prior attempts to provide two-color embossing have been made. One attempt to achieve two-material and/or two-color embossure of thermoplastic materials requires the painting, doctoring or injecting of a second material into portions of a die for embossing the thermoplastic material where it is desired to have the distinguishable second material and/or color. Painting and doctoring are difficult to achieve with accuracy and require skilled hand labor, especially for small areas to be inserted in the embossing die.

Another approach to achieve two-material and/or two-color embossing requires fitting the die with a rod or strip of thermoplastic material to be weldingly combined with the workpiece when the workpiece is embossed. Where the pattern to receive the second color is small or complex, the latter technique requires skilled hand labor and considerable time to appropriately fit the second layer into the embossing die.

Still another effort to achieve two-material and/or two-color embossure requires doctoring a second material into bas-relief features in the workpiece. The features may be molded in situ with the workpiece or later punched or flow-molded into the workpiece by a die for that purpose. In addition to the problem of precisely filling small features, this procedure has the problem of cleaning the second material from the workpiece surface adjacent the feature, particularly if that surface is uneven, for example as in suede.

SUMMARY OF THE INVENTION

Accordingly it is an object of the invention to provide an improved method of distinctively embossing a multiple layer workpiece in which the layers may be of different materials and/or colors, which method may rapidly be carried out by relatively unskilled labor.

To this end the method of the invention contemplates providing a workpiece having a layer with a surface and a second layer on the surface at least one of which layers is thermoplastic. At least a portion of the periphery of the second layer is secured to the surface. The surface and second layer of the workpiece are then embossed under conditions of heat and pressure with a die having a pattern at least a portion of which corresponds to the periphery of the second layer to mold the workpiece according to the pattern on the die.

In a preferred form the method of the invention is practiced by a first die having die surfaces corresponding to part of the periphery of an area portion to be embossed on the workpiece. The die is first caused to engage a blank or piece of material having surface features it is desired to reproduce on the workpiece to mark the blank with the die surfaces. Means for operating on the blank such as punches or sewing instrumentalities is then located on the blank relative to the mark and appropriately operated to make the blank into a model of the desired workpiece. A second die is then made conformably to the model. Workpiece layers are next assembled in overlapping relation; at least one layer must be made from a thermoplastic material suitable for welding and embossing. The first die then engages the workpiece to weld the layers together along the die surfaces defining the periphery of the area portion to be embossed. Portions of one layer outside the welded periphery are then removed from the workpiece to leave an area portion of the one layer secured to the other layer about the periphery of the area portion. The second die is registered or aligned with the workpiece to appropriately locate at least a portion of the pattern on the second die in correspondence with the periphery of the second layer of the workpiece. The second die is then engaged with the workpiece to emboss the workpiece. Simultaneously with the embossing, the second die welds the one layer to the other layer over the entire area portion previously welded only about its periphery. The assembled, embossed, multiple layer workpiece is now ready for use.

DESCRIPTION OF THE DRAWINGS

A preferred form of the method of the invention which is merely illustrative of and not a limitation on the invention will now be more particularly described with reference to drawings of apparatus which may be employed, in which.

DESCRIPTION OF THE PREFERRED EMBODIMENT

Figure 1:
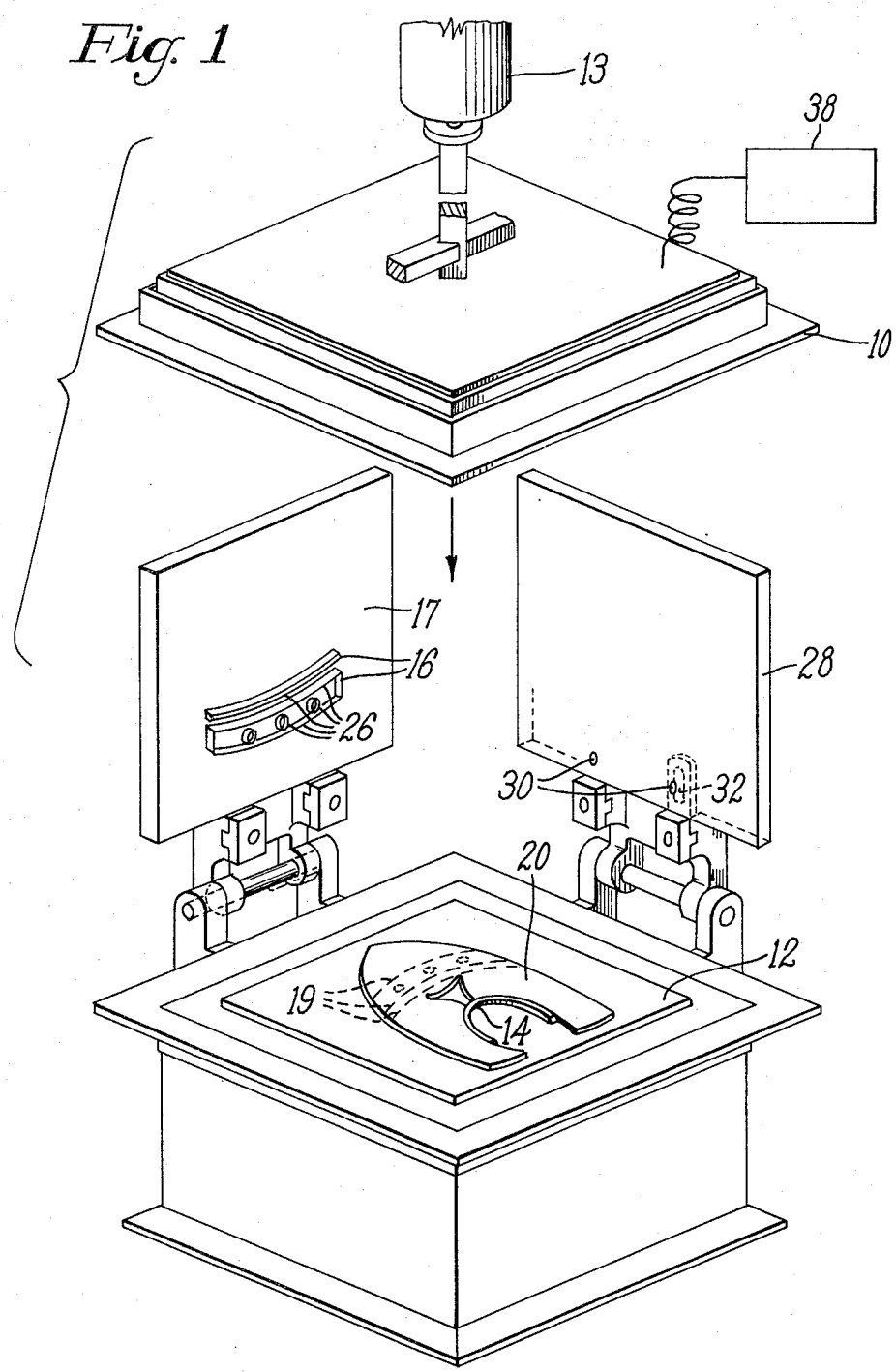
FIG. 1 is a perspective view of a high frequency press for carrying out the marking step of the method.

FIG. 1 shows one apparatus for carrying out a preferred form of the method of the invention. The apparatus comprises a high frequency press typical of a type well known in the art. The press has upper and lower platens 10 and 12, respectively, mounted for relative movement of approach and separation, as by piston and cylinder 13, to apply pressure to a workpiece and die placed between the platens. The lower platen is provided with guides 14 for locating a blank or a workpiece (FIGS. 3 and 4) placed on the platen. A first die 16 is mounted on a frame 17 of the press for pivotal movement into and out of engagement with the blank or workpiece on the platen 12.

In practicing the preferred method in the shoe industry, for example, a blank 20 is made from sheet material in the shape of an unlasted or flat shoe upper portion. The blank is located on the lower platen 12 by the guides 14 of the press as shown in FIG. 1. The first die 16 is then pivoted into engagement with the blank and the platens of the press move toward each other to apply pressure to the die and workpiece sufficient to impress or mark the blank with die surfaces 26 of the first die, as shown in phantom at 19. The blank is then removed from the press and operated upon by conventional operating instrumentalities conveniently positioned on the blank relative to the mark 19.

Figure 2:
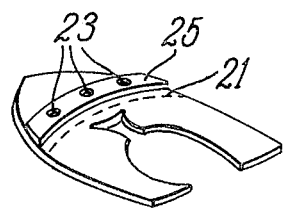
FIG. 2 is a perspective view of a model which may be used in the method.

As indicated in FIG. 2, for example, the operating instrumentalities may be stitchforming mechanism of a well known single needle sewing machine located relative to the mark to form a row of stitches 21 along part of the mark. Punched holes 23 and an additional ply or layer 25 may also be superposed. The blank then constitutes a model of the desired workpiece, shown completed in FIG. 2.

Figure 3:
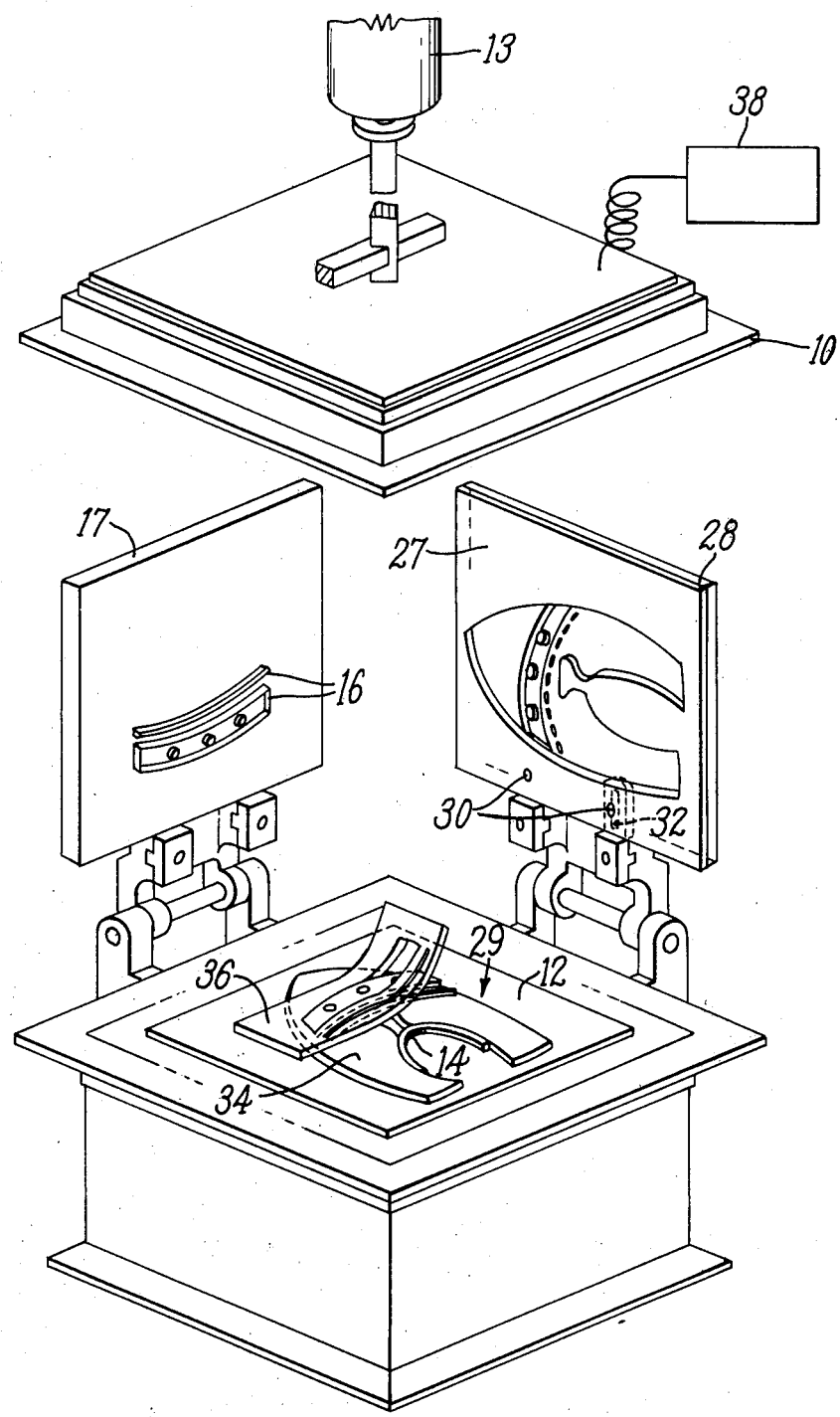
FIG. 3 is a view of the press in FIG. 1 after a first die has welded workpiece layers.
Figure 4:
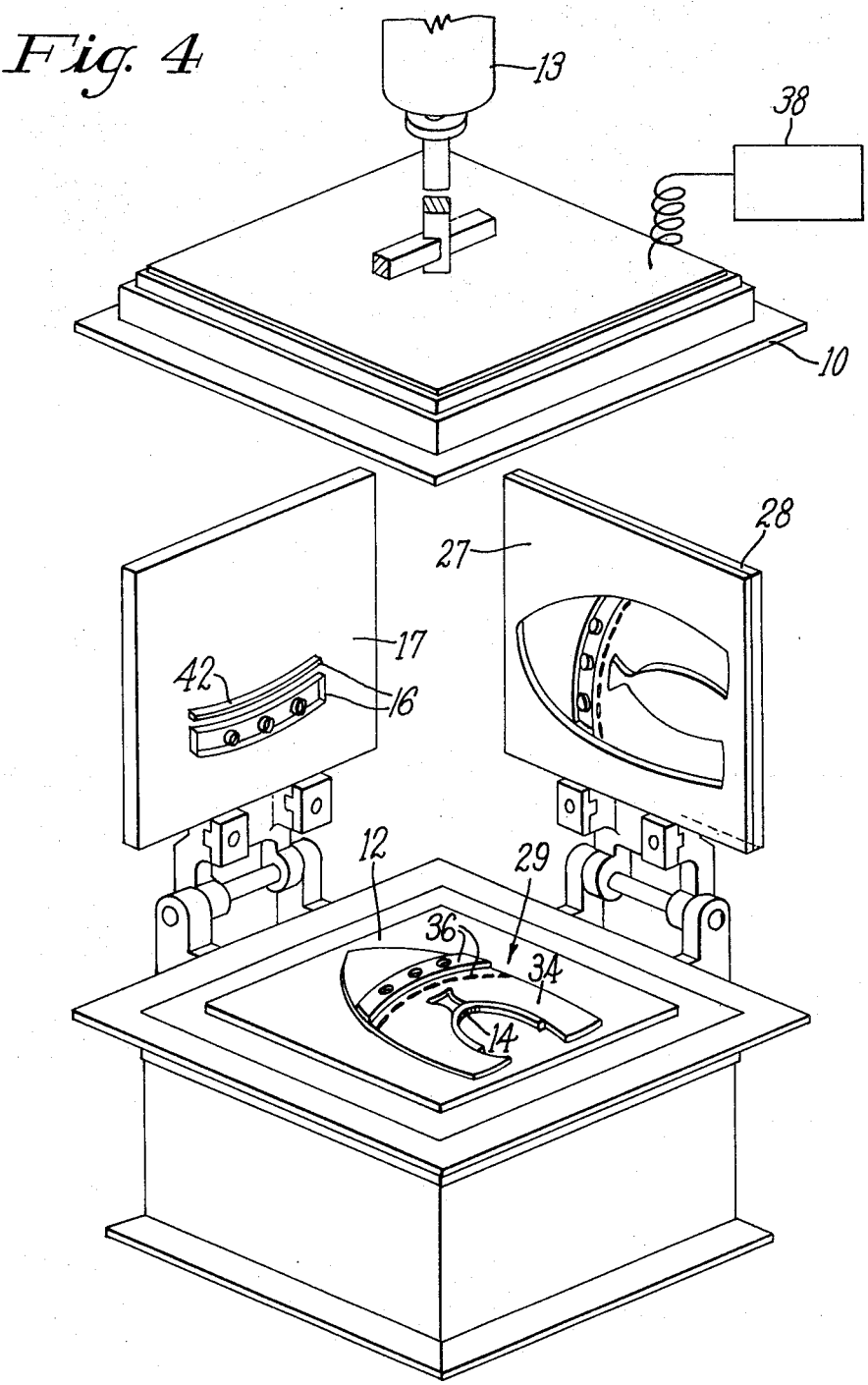
FIG. 4 is a view of the press in FIG. 1 and a second die after embossing and welding the workpiece.

A second die 27 (FIGS. 3, 4) is then made conformably to the model 20, 25 and mounted on a frame 28 of the press as shown in FIG. 3. The frame 28, like the frame 17, is pivotally mounted on the press to permit engagement of the die 27 with a workpiece generally at 29 (FIG. 4) located on the lower platen by the guides 14. Since the frames 17 and 28 and the guides 14 are each mounted on the press, registration of the dies 16 and 27 on the frames and workpiece on the guides may be accomplished by adjusting the position of any one frame or the guides relative to the press. For example, the frame 28 is here secured to the press by adjustably engagable fasteners 30 extending through elongated slots 32 in a hinge portion of the press so as to be positionable relative to the press to register the die 27 with the workpiece 29. Clamping engagement of the fasteners with the hinge portions secures the die 27 in registration with the other die and workpiece. Thus, registration need be accomplished only once for operation on a series of similar workpieces and may be first accomplished at any time prior to embossing the workpiece with the second die.

In practicing the invention a layer 34 of the workpiece 29 is first located on the lower platen 12 by the guides 14. An additional workpiece layer 36 is placed over the layer 34 on the press. At least one of the layers of the workpiece is made from a thermoplastic material. The first die 16 is then pivoted into engagement with the layers of the workpiece and the platens moved toward each other to apply pressure to the die and workpiece.

High frequency energy from a source 38 (FIG. 1) in communication with the upper platen 10 is then applied through the platen to the die to weld together the layers of the workpiece 29 about the periphery of an area portion defined by the die surfaces of the first die 16. The platens are then moved away from each other and the first die removed from engagement with the workpiece. The source 38 is de-energized.

As seen in FIG. 3, one layer 36 of the workpiece is then separated from the other in areas outside the welded periphery of the area portion. The outside separated portions of the layer 36 are removed. The second die 27 is then pivoted or otherwise moved into engagement with the workpiece 29 and registered with the workpiece relative to the retained area portion of the layer 36. The platens 10, 12 are again moved toward each other to engage the second die 27, and the high frequency source 38 turned on to apply high frequency energy to the workpiece 29 for embossing the workpiece into conformity with the second die 27. The second die also welds together the layers of the workpiece over the entire area portion. The workpiece as finally seen in FIG. 4 then has distinct embossed and combined layers and may be removed from the press for use.

The first die 16 is generally of the type known for line welding thermoplastic materials in a process usually termed applique welding. The die may be made from any material but preferably has a dielectric constant lower than that of the workpiece material so that the high frequency heating action is concentrated in the workpiece. Soft steel or brass is suitable.

The die surfaces 26 of the die 16 need not be continuous, it being understood that the area portion defined by the die surfaces on the workpiece need have only a portion of its periphery corresponding to the die surfaces. The die surface may be of any convenient width and length.

In cross section the die surface may be flat, rounded, beveled or grooved. For larger area portions, it is preferred to bevel the edge toward the area portion so as to weld the layers about the periphery of the area portion and cleanly cut the one layer along extremities of the periphery corresponding to the acute angle of the bevel. For smaller area portions, as for the row of stitches 21, for example, it is preferred to groove the die surface.

A portion 42 (FIG. 4) of the die 16 is provided with such a groove. The portion 42 is formed from a thin metal strip suitably on the order of about 0.028 inch thick at the die surface. Its die surface is engraved with a groove of V-shaped cross section of from 0.010 to 0.015 inch at its maximum width in the plane of the die surface. The strip of one work layer welded to the other layer of the workpiece with such a die is about 0.025 inch wide.

The second die 27 may be made conformably to the model seen in FIG. 2, by any convenient process such as engraving or photoengraving. The die may also be made by molding the die to the model as described in co-pending U.S. patent application Ser. No. 170,046 filed Aug. 9, 1971, now abandoned, in the name of S. A. Vinter. The die may be made from any convenient material preferably having a dielectric constant lower than that of the workpiece material to concentrate the high frequency heating energy in the workpiece.

Operating conditions of the high frequency press for first peripherally welding and then embossing the workpiece depend upon the workpiece material. For a workpiece of polyvinyl chloride, the peripheral weld may be accomplished with about 40 psi. pressure and a die temperature of about 120° C in about 1 to 2 seconds. A high frequency field of from 6 to 10 Kws. at a frequency of about 27 mHz. is suitable. With a similar high frequency field, the embossing may be accomplished in from 4 to 15 seconds at a pressure of 200 psi. A dwell period of up to 5 seconds may be provided under pressure after termination of the field to permit the embossure to set.

It should be understood that components of the apparatus for carrying out the above described method of the invention may be modified and/or interchanged with functional equivalents without departing from the scope of the invention. For example, the high frequency heating may be replaced by conduction heating through the die to achieve the welding and embossing. The weldable workpiece may be made from any convenient thermoplastic material, including those which are thermoactivatable and those which are thermosettable, but preferably is made from polyvinyl chloride.

Having thus described my invention, what I claim as new and desire to secure by Letters Patent of the United States is:

1. A method of embossing a multiple layer workpiece comprising the steps of:

engaging a blank with a first die to mark the blank along the periphery of an area portion defined by die surfaces of the first die;

locating a means for operating on the blank relative to the imposed mark;

activating the operating means to make the blank into a model of the workpiece;

making a second die conformably to the model;

assembling layers of the workpiece in overlapping relation to each other;

welding together the layers of the workpiece only along the periphery of the area portion defined by the die surfaces of the first die with the first die;

removing portions of one layer of the workpiece outside the welded periphery of the area portion;

registering the second die with the workpiece relative to the retained area portion of the workpiece; and lastly applying heat and pressure to the second die for simultaneously embossing the workpiece and welding together the layers of the workpiece over the entire area portion of the workpiece defined by the second layer.

2. A method as in claim 1 wherein the steps of welding and embossing comprise the steps of pressing one of the dies on the workpiece and heating the workpiece with high frequency energy.

* * * * *